(12) United States Patent
Senda et al.

(10) Patent No.: US 9,403,955 B2
(45) Date of Patent: *Aug. 2, 2016

(54) POLY LACTIC ACID-CONTAINING FILM OR SHEET, AND METHOD FOR MANUFACTURING THEREOF

(75) Inventors: Hiroki Senda, Ibaraki (JP); Shigeki Ishiguro, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 102 days.

This patent is subject to a terminal disclaimer.

(21) Appl. No.: 13/266,275

(22) PCT Filed: Mar. 25, 2011

(86) PCT No.: PCT/JP2011/057322
§ 371 (c)(1),
(2), (4) Date: Oct. 26, 2011

(87) PCT Pub. No.: WO2011/122465
PCT Pub. Date: Oct. 6, 2011

(65) Prior Publication Data
US 2012/0046402 A1 Feb. 23, 2012

(30) Foreign Application Priority Data
Mar. 30, 2010 (JP) .................................. 2010-078661

(51) Int. Cl.
*C08K 5/09* (2006.01)
*C09K 5/12* (2006.01)
(Continued)

(52) U.S. Cl.
CPC . *C08J 5/18* (2013.01); *B29C 43/24* (2013.01); *B29C 47/0021* (2013.01);
(Continued)

(58) Field of Classification Search
CPC ......... C08L 67/04; C08L 23/26; C08L 27/12; C08L 27/18; C08L 2203/16; C08L 2205/03; C08L 2205/08; C08L 2205/24; C08J 5/18; B29C 43/46; B29C 43/52; B29C 47/88; B29C 47/886; B29C 47/8885
USPC ....................................................... 524/296
See application file for complete search history.

(56) References Cited

U.S. PATENT DOCUMENTS

| 5,484,881 A | * | 1/1996 | Gruber | .................... | A61L 15/26 156/244.11 |
| 5,502,158 A | * | 3/1996 | Sinclair | .................... | A61L 15/26 523/124 |

(Continued)

FOREIGN PATENT DOCUMENTS

| CN | 101023133 | 8/2007 |
| EP | 1792941 | 6/2007 |

(Continued)

OTHER PUBLICATIONS

Dr Collin GmbH product brochure, obtained Jan. 24, 2014 www.drcollin.de.*

(Continued)

*Primary Examiner* — Jane L Stanley
(74) *Attorney, Agent, or Firm* — Greenblum & Bernstein, P.L.C.

(57) ABSTRACT

Provided are a film or sheet composed of a resin composition that includes a poly lactic acid (A), an acidic functional group-modified olefinic polymer (B) including an acidic functional group and having an acid value of 10 to 70 mg KOH/g and a weight average molecular weight of 10,000 to 80,000, a tetrafluoroethylene polymer (C), and a dicarboxylic acid ester-containing plasticizer (D) containing a compound of General Formula (1) and in which the dicarboxylic acid ester-containing plasticizer (D) is included in an amount of 8 parts by weight or more and less than 40 parts by weight based on 100 parts by weight of the poly lactic acid (A), and a method for manufacturing the film or sheet by melt film formation. Each sign in Formula is as described in the specification.

[Formula 1]

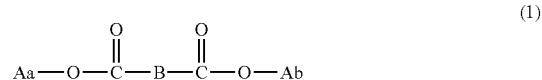

(1)

18 Claims, 1 Drawing Sheet

(51) Int. Cl.

| | |
|---|---|
| *C08J 5/18* | (2006.01) |
| *B29C 43/24* | (2006.01) |
| *B29C 47/00* | (2006.01) |
| *B29C 47/32* | (2006.01) |
| *B29C 47/88* | (2006.01) |
| *C08L 27/18* | (2006.01) |
| *C08L 67/04* | (2006.01) |
| *C08L 23/26* | (2006.01) |
| *C08L 101/16* | (2006.01) |
| *B29K 23/00* | (2006.01) |
| *B29K 27/18* | (2006.01) |
| *B29K 67/00* | (2006.01) |
| *B29K 105/00* | (2006.01) |
| *C08K 5/11* | (2006.01) |
| *C08L 23/08* | (2006.01) |
| *C08L 51/06* | (2006.01) |
| *C08K 5/12* | (2006.01) |

(52) U.S. Cl.
CPC ............ *B29C 47/32* (2013.01); *B29C 47/8845* (2013.01); *C08L 23/26* (2013.01); *C08L 27/18* (2013.01); *C08L 67/04* (2013.01); *C08L 101/16* (2013.01); *B29K 2023/00* (2013.01); *B29K 2027/18* (2013.01); *B29K 2067/00* (2013.01); *B29K 2067/046* (2013.01); *B29K 2105/0038* (2013.01); *C08J 2367/04* (2013.01); *C08K 5/11* (2013.01); *C08K 5/12* (2013.01); *C08L 23/0869* (2013.01); *C08L 51/06* (2013.01); *C08L 2205/03* (2013.01)

(56) References Cited

U.S. PATENT DOCUMENTS

| | | | | |
|---|---|---|---|---|
| 6,534,172 | B1* | 3/2003 | Kawashima | ................. 428/343 |
| 7,863,382 | B2 | 1/2011 | Ishii et al. | |
| 7,999,021 | B2 | 8/2011 | Kumazawa et al. | |
| 8,445,593 | B2 | 5/2013 | Ishii et al. | |
| 2004/0242803 | A1* | 12/2004 | Ohme et al. | ................. 525/400 |
| 2005/0032961 | A1* | 2/2005 | Oguni et al. | ................. 524/442 |
| 2005/0137304 | A1* | 6/2005 | Strand et al. | ................. 524/284 |
| 2007/0299170 | A1* | 12/2007 | Ozawa | ................. C08K 5/53 524/132 |
| 2008/0262151 | A1 | 10/2008 | Ishii et al. | |
| 2010/0160505 | A1 | 6/2010 | Kumazawa et al. | |
| 2011/0071247 | A1 | 3/2011 | Ishii et al. | |
| 2011/0201746 | A1 | 8/2011 | Ishiguro et al. | |
| 2011/0269907 | A1 | 11/2011 | Kumazawa et al. | |
| 2012/0003459 | A1 | 1/2012 | Ishiguro et al. | |

FOREIGN PATENT DOCUMENTS

| | | |
|---|---|---|
| EP | 1911807 | 4/2008 |
| EP | 2345691 | 7/2011 |
| JP | 3865960/JP2000-198908 | 7/2000 |
| JP | 2003-113298 A | 4/2003 |
| JP | 2003-147213 | 5/2003 |
| JP | 2006-16447 | 1/2006 |
| JP | 2007-130894 | 5/2007 |
| JP | 2007-177213 | 7/2007 |
| JP | 2008-13742 | 1/2008 |
| JP | 4246196/JP2007-130893 | 1/2009 |
| JP | 2011-52149 | 3/2011 |
| WO | 2010/038833 | 4/2010 |

OTHER PUBLICATIONS

Search report from E.P.O., mail date is Sep. 3, 2013.
U.S. Appl. No. 13/260,780 to Hiroki Senda et al., which was filed on Sep. 28, 2011.
U.S. Appl. No. 13/266,296 to Shigeki Ishiguro et al., which was filed on Oct. 26, 2011.
Search report from International Application No. PCT/JP2011/057322, mail date is Feb. 24, 2011.
China Office action in CN201180001491.6, dated Jul. 22, 2014 along with an English translation thereof.
Chinese office action in CN201180001491 6, mail date is Nov. 5, 2013 along with an English language translation thereof.
Chinese Office Action issued with respect to application No. 201180001491.6, mail date is Jan. 16, 2015.
Office Action in Japanese Patent Application No. 2011-526169 issued Nov. 4, 2014 and English translation thereof.

* cited by examiner

POLY LACTIC ACID-CONTAINING FILM OR SHEET, AND METHOD FOR MANUFACTURING THEREOF

TECHNICAL FIELD

The present invention relates to poly lactic acid-containing films or sheets that have heat resistance and roll lubricity as well as excellent flexibility.

BACKGROUND ART

A poly lactic acid resin is a biomass polymer and therefore has been drawing attention in recent years against the background of the depletion of petroleum resources, the reduction of carbon dioxide emissions, and the like.

However, the poly lactic acid has a low crystallization rate and is unlikely to be crystallized by a common film forming procedure. Hence, a film composed of a resin composition containing the poly lactic acid has a problem of poor heat resistance. For example, such a film is thermally deformed at about 60° C. or more that is a glass transition temperature of the poly lactic acid and cannot keep a film shape.

The addition of a plasticizer and the like is a known method for improving brittleness of the poly lactic acid.

However, commonly, the addition of a plasticizer having good compatibility with the poly lactic acid lowers a glass transition temperature of the poly lactic acid, and the heat resistance of the film is often further lowered than that of a film containing poly lactic acid alone. Thus, such a film is difficult to be used at the glass transition temperature or more.

Patent Document 1 discloses a method for improving the heat resistance in which poly lactic acid including a plasticizer is molded at a temperature between the glass transition temperature and the melting point to improve the heat resistance. However, there is no description about the specific time required for crystallization, and it is unknown whether a film can be continuously formed at a practicable speed.

There is also disclosed a method for obtaining a molded article that has good injection molding properties (time required for molding), a high Vicat softening point (high heat resistance), and flexibility by adding a plasticizer, polyalkylene glycol, and a styrene copolymer to the poly lactic acid (Patent Document 2).

However, the method requires a large amount of the styrene copolymer to remarkably reduce biomass degree. Moreover, such a molded article has a low heat resistance at about 80° C. and does not have a heat resistance applicable for heat-resistant parts in home electric appliances or automobiles.

There is disclosed another method of crystallization by adding a particular plasticizer and a crystal nucleating agent to poly lactic acid to give a mixture, forming a film from the mixture with an extruder, once cooling the film, and then passing the film through a process from 60 to 100° C. (Patent Document 3).

However, the method is inefficient because a film is once cooled and solidified, and then heated again.

There is another problem. That is, when a resin composition containing the poly lactic acid is melted to form a film or sheet using metal rolls, the resin composition adheres to the metal rolls to interfere with the formation of the film or sheet because the resin composition has a poor releasability from the rolls.

CITATION LIST

Patent Literature

Patent Document 1: Japanese Patent No. 3865960
Patent Document 2: Japanese Unexamined Patent Application No. 2007-177213
Patent Document 3: Japanese Patent No. 4246196

SUMMARY OF INVENTION

Technical Problem

An object of the present invention is to provide a poly lactic acid-containing film or sheet having excellent heat resistance by maintaining high crystallizability and having flexibility and a method for manufacturing the film and sheet.

Solution to Problem

The present inventors have carried out intensive studies to solve the problems, and as a result, have found that a film or sheet having heat resistance and flexibility can be obtained by using a particular dicarboxylic acid ester-containing plasticizer that melts in a temperature range where poly lactic acid is melted and kneaded for achieving flexibility and by adding a tetrafluoroethylene polymer for improving the crystallizability of poly lactic acid, and the invention has been accomplished.

That is, the present invention is as described below.

[1] A film or sheet is composed of a resin composition that includes a poly lactic acid (A), an acidic functional group-modified olefinic polymer (B) including an acidic functional group and having an acid value of 10 to 70 mg KOH/g and a weight average molecular weight of 10,000 to 80,000, a tetrafluoroethylene polymer (C), and a dicarboxylic acid ester-containing plasticizer (D) of General Formula (1). The dicarboxylic acid ester-containing plasticizer (D) is included in an amount of 8 parts by weight or more and less than 40 parts by weight based on 100 parts by weight of the poly lactic acid (A).

[Formula 1]

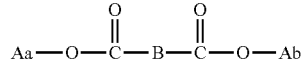

(1)

(Where B is a 1,2-phenylene group or —CH$_2$(CH$_2$)$_m$CH$_2$— (where m is an integer of 0 to 6), each of Aa and Ab is independently selected from (1) to (3) (where a compound in which both Aa and Ab are (3) is excluded): (1) C$_6$H$_5$—(Ac)— (where Ac is an alkylene group having 1 to 4 carbon atoms); (2) (Ae)-(Ad-O)$_n$— (where Ad is an alkylene group having 1 to 5 carbon atoms, Ae is an alkyl group having 1 to 7 carbon atoms, and n is an integer of 1 to 4); and (3) an alkyl group having 1 to 14 carbon atoms)

[2] In the film or sheet according to the aspect [1], the dicarboxylic acid ester-containing plasticizer (D) is a phthalate ester-containing plasticizer (DP) selected from compounds of General Formulae (2) to (6), and the phthalate ester-containing plasticizer (DP) is included in an amount of 10 parts by weight or more and less than 40 parts by weight based on 100 parts by weight of the poly lactic acid (A).

[Formula 2]

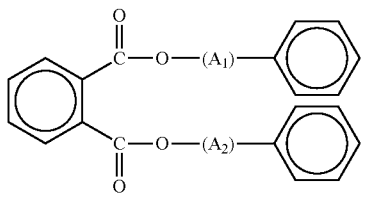
(2)

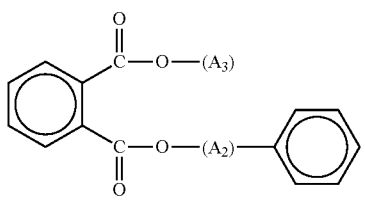
(3)

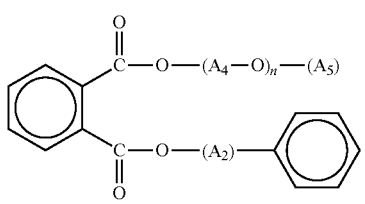
(4)

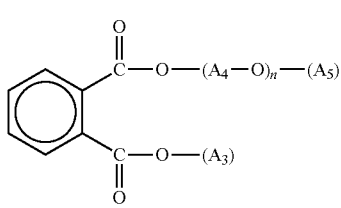
(5)

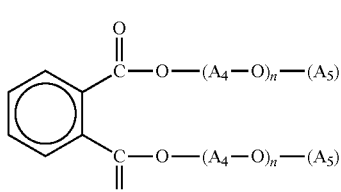
(6)

(Where A1 and A2 are the same or different from each other; each of A1 and A2 is an alkylene group having 1 to 4 carbon atoms; A3 is an alkyl group having 1 to 14 carbon atoms; A4 is an alkylene group having 1 to 5 carbon atoms; A5 is an alkyl group having 1 to 7 carbon atoms; and n is an integer of 1 to 4)

[3] In the film or sheet according to the aspect [1], the dicarboxylic acid ester-containing plasticizer (D) is an aliphatic dicarboxylic acid ester-containing plasticizer (DA) selected from compounds of General Formulae (7) to (11), and the aliphatic dicarboxylic acid ester-containing plasticizer (DA) is included in an amount of 8 to 35 parts by weight based on 100 parts by weight of the poly lactic acid (A).

[Formula 3]

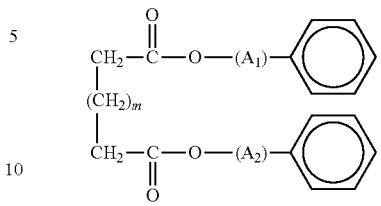
(7)
(8)

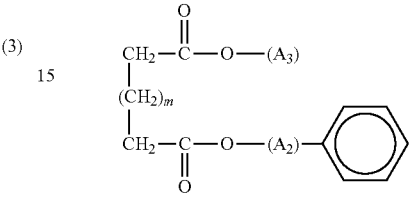
(9)

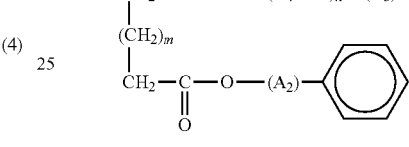
(10)

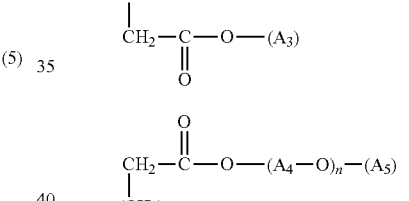
(11)

(Where A1 and A2 are the same or different from each other; each of A1 and A2 is an alkylene group having 1 to 4 carbon atoms; A3 is an alkyl group having 1 to 14 carbon atoms; A4 is an alkylene group having 1 to 5 carbon atoms; A5 is an alkyl group having 1 to 7 carbon atoms; n is an integer of 1 to 4; and m is an integer of 0 to 6)

[4] In the film or sheet according to any one of the aspects [1] to [3], the acidic functional group included in the acidic functional group-modified olefinic polymer (B) is a carboxylic acid anhydride group.

[5] In the film or sheet according to any one of the aspects [1] to [4], the tetrafluoroethylene polymer (C) is included in an amount of 0.5 to 15.0 parts by weight based on 100 parts by weight of the poly lactic acid (A).

[6] In the film or sheet according to any one of the aspects [1] to [5], the acidic functional group-modified olefinic polymer (B) is included in an amount of 0.1 to 10.0 parts by weight based on 100 parts by weight of the poly lactic acid (A).

[7] In the film or sheet according to any one of the aspects [1] to [6], the resin composition further includes a crystallization accelerator (E), and the crystallization accelerator (E)

is included in an amount of 0.1 to 5.0 parts by weight based on 100 parts by weight of the poly lactic acid (A).

[8] The film or sheet according to any one of the aspects [1] to [7] has a deformation rate of 40% or less under a load of 10 N for 30 minutes in a temperature environment of 120° C. in accordance with heat deformation test in Japanese Industrial Standard C3005, and has a relative crystallization rate of 50% or more calculated from Equation (I)

$$\text{Relative crystallization rate (\%)} = (\Delta Hm - \Delta Hc)/\Delta Hm \times 100 \quad (I)$$

(where $\Delta Hc$ is an amount of heat of an exothermic peak associated with crystallization of the film or sheet in a temperature rise process after film formation, and $\Delta Hm$ is an amount of heat associated with melting).

[9] The film or sheet according to any one of the aspects [1] to [8] has a tensile elongation at break of 100% or more and a residual stress ratio of 40% or less at a stretch of 10%.

[10] A method for manufacturing the film or sheet according to any one of the aspects [1] to [9] includes forming a film from a resin composition by melt film formation. In the method, the resin composition during the melt film formation has a temperature between a temperature 15° C. higher than a crystallization temperature (Tc) of the resin composition in a temperature drop process and a temperature 5° C. lower than a melting temperature (Tm) in a temperature rise process, or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc).

[11] In the method for manufacturing the film or sheet according to the aspect [10], the resin composition during the melt film formation has a temperature between a temperature 15° C. higher than a crystallization temperature (Tc) of the resin composition in a temperature drop process and a temperature 5° C. lower than a melting temperature (Tm) in a temperature rise process, and the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc).

[12] In the method for manufacturing the film or sheet according to the aspect [10] or [11], the melt film formation is a technique of forming a film having a desired thickness by passing the melted resin composition through a space between two metal rolls.

[13] In the method for manufacturing the film or sheet according to any one of the aspects [10] to [12], the crystallization accelerating step is performed by using a metal roll.

Advantageous Effects of Invention

According to the present invention, a poly lactic acid-containing film or sheet having roll lubricity and flexibility can be provided while maintaining excellent heat resistance.

DESCRIPTION OF EMBODIMENTS

Figure 1:
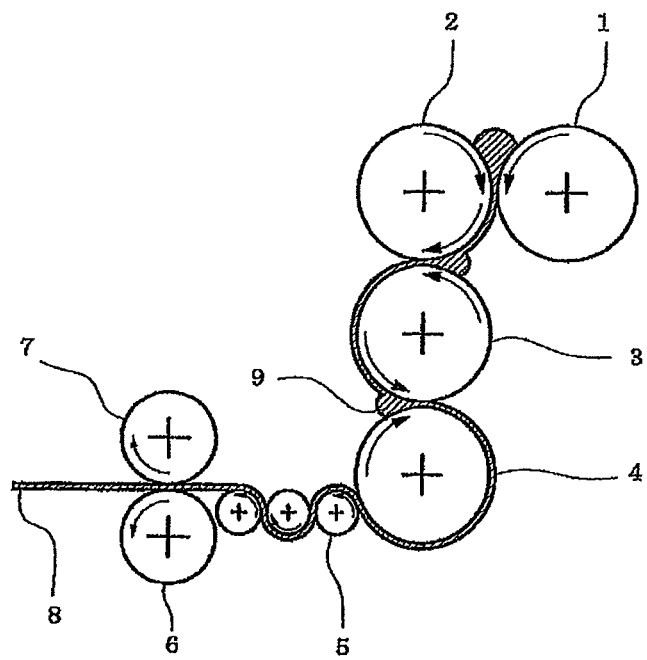
FIG. 1 is a schematic view of a calender film formation machine.

Hereinafter, the present invention will be described in detail.

The film or sheet of the present invention is composed of a resin composition that includes a poly lactic acid (A), an acidic functional group-modified olefinic polymer (B), a tetrafluoroethylene polymer (C), and a dicarboxylic acid ester-containing plasticizer (D). The film or sheet of the present invention includes a transparent film or sheet, a translucent film or sheet, and an opaque film or sheet.

The thickness of the film or sheet of the present invention is not necessarily limited, but is commonly 10 to 500 µm, preferably 20 to 400 µm, and more preferably 30 to 300 µm.

[Poly Lactic Acid (A)]

Lactic acid that is a material monomer of the poly lactic acid includes L- and D-optical isomers due to its asymmetric carbon atom. The poly lactic acid (A) used in the present invention is a polymer mainly composed of L-lactic acid. A polymer containing a smaller amount of D-lactic acid as an impurity during the manufacture has a higher crystallinity and a higher melting point. Hence, lactic acid to be used preferably has an L-lactic acid purity as high as possible, and the purity of L-lactic acid is more preferably 95% or more. The poly lactic acid (A) used in the present invention may include other copolymerizable components in addition to the lactic acid. Examples of other monomer units include glycol compounds such as ethylene glycol, propylene glycol, butanediol, heptanediol, hexanediol, octanediol, nonanediol, decanediol, 1,4-cyclohexanedimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenyl ether dicarboxylic acid, 5-sodium sulfoisophthalic acid, and 5-tetrabutylphosphonium isophthalic acid; hydroxycarboxylic acids such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepan-2-one. The content of such an other copolymerizable component is preferably 0 to 30% by mol and preferably 0 to 10% by mol based on the total monomer components.

The weight average molecular weight of the poly lactic acid (A) is, for example, 10,000 to 400,000, preferably 50,000 to 300,000, and more preferably 80,000 to 150,000. The melt flow rate of the poly lactic acid (A) at 190° C. under a load of 21.2 N [Japanese Industrial Standard K-7210 (test condition 4)] is, for example, 0.1 to 50 g/10 minutes, preferably 0.2 to 20 g/10 minutes, more preferably 0.5 to 10 g/10 minutes, and particularly preferably 1 to 7 g/10 minutes. The poly lactic acid (A) having a too high melt flow rate may form a film or sheet having poor mechanical characteristics and heat resistance. The poly lactic acid (A) having a too low melt flow rate may lead to a too high load during film formation.

In the specification, the "weight average molecular weight" means that determined by gel permeation chromatography (GPC) (in terms of polystyrene). Conditions for GPC are as described below.

Column: TSKgel SuperHZM-H/HZ2000/HZ1000
Column size: 4.6 mm ID×150 mm
Eluant: chloroform
Flow rate: 0.3 ml/min
Detector: RI
Column temperature: 40° C.
Injection volume: 10 µl The method for producing the poly lactic acid is not necessarily limited and typical examples of the production method include lactide method and direct polymerization method. The lactide method is as follows: lactic acid is heated and dehydrocondensed to give poly lactic acid having a low molecular weight; the poly lactic acid is heated and decomposed under reduced pressure to give lactide that is a cyclic dimer of lactic acid; and the lactide is ring-opening polymerized in the presence of a metal salt catalyst such as tin(II) octanoate to give poly lactic acid having a high molecular weight. The direct polymerization method is as follows: lactic acid is heated in a solvent such as diphenyl ether under reduced pressure to be polymerized while removing water in order to suppress hydrolysis to give poly lactic acid directly.

A commercial product may be used as the poly lactic acid (A). Examples of the commercial product include trade names "Lacea H-400" and "Lacea H-100" (manufactured by Mitsui Chemicals, Inc.) and trade names "Terramac TP-4000" and "Terramac TE-4000" (manufactured by Unitika Ltd.). A poly lactic acid (A) produced by a known or common polymerization method (for example, emulsion polymerization and solution polymerization) may be also used.

[Acidic Functional Group-Modified Olefinic Polymer (B)]

The manufacture of the film or sheet of the present invention requires the film formation by passing the melted poly lactic acid (A)-containing resin composition through a space between metal rolls with, for example, a calender film formation machine. Thus, the resin composition must be readily removed from the metal roll surfaces. The acidic functional group-modified olefinic polymer (B) included in the film or sheet of the present invention works as a lubricant to give a desired roll lubricity (that is, releasability form a roll) to the poly lactic acid (A)-containing resin composition.

Examples of the acidic functional group of the acidic functional group-modified olefinic polymer (B) include a carboxyl group and groups derived from it. The group derived form the carboxyl group is chemically derived from the carboxyl group, and examples include a carboxylic acid anhydride group, an ester group, an amide group, an imide group, and a cyano group. The carboxylic acid anhydride group is preferred.

The acidic functional group-modified olefinic polymer (B) is obtained by, for example, graft polymerization of an unmodified polyolefin polymer with an unsaturated compound containing the "acidic functional group" (hereinafter, also abbreviated to an acidic functional group-containing unsaturated compound).

Examples of the unmodified polyolefin polymer include polymers including polyolefins such as high-density polyethylene, medium-density polyethylene, low-density polyethylene, polypropylene, polybutene, poly-4-methylpentene-1, a copolymer of ethylene and α-olefin, and a copolymer of propylene and α-olefin and oligomers of them; polyolefin elastomers such as ethylene-propylene rubber, ethylene-propylene-diene copolymer rubber, butyl rubber, butadiene rubber, a low-crystalline ethylene-propylene copolymer, a propylene-butene copolymer, an ethylene-vinyl ester copolymer, an ethylene-methyl(meth)acrylate copolymer, an ethylene-ethyl(meth)acrylate copolymer, an ethylene-maleic anhydride copolymer, and a blend of polypropylene and ethylene-propylene rubber; and a mixture of two or more of them. Preferred are polypropylene, a copolymer of propylene and α-olefin, low-density polyethylene, and oligomers of them, and particularly preferred are polypropylene, a copolymer of propylene and α-olefin, and oligomers of them. Examples of the "oligomers" include compounds obtained from a corresponding polymer by thermal decomposition in accordance with molecular weight reduction method. Such oligomers can also be obtained by polymerization.

Examples of the acidic functional group-containing unsaturated compound include a carboxyl group-containing unsaturated compound and an unsaturated compound containing a group derived from a carboxyl group. Examples of the carboxyl group-containing unsaturated compound include maleic acid, itaconic acid, chloroitaconic acid, chloromaleic acid, citraconic acid, and (meth)acrylic acid. Examples of the unsaturated compound containing a group derived from a carboxyl group include carboxylic acid anhydride group-containing unsaturated compounds such as maleic anhydride, itaconic anhydride, chloroitaconic anhydride, chloromaleic anhydride, and citraconic anhydride; (meth)acrylic acid esters such as methyl(meth)acrylate, glycidyl(meth)acrylate, and 2-hydroxyethyl (meth)acrylate; and (meth)acrylamide, maleimide, and (meth)acrylonitrile. Preferred are carboxyl group-containing unsaturated compounds and carboxylic acid anhydride group-containing unsaturated compounds, more preferred are carboxylic acid anhydride group-containing unsaturated compounds, and maleic anhydride is even more preferred.

Importantly, the acidic functional group-modified olefinic polymer (B) has a weight average molecular weight of 10,000 to 80,000, preferably 15,000 to 70,000, and more preferably 20,000 to 60,000. The polymer having a weight average molecular weight of less than 10,000 causes bleed out after the formation of the film or sheet, and the polymer having a weight average molecular weight of more than 80,000 leads to separation of the polymer from the poly lactic acid during roll kneading. Here, the bleed out means the phenomenon of bleeding of a low molecular weight component out to the surface of a film or sheet with time after the film or sheet formation. In the specification, the "weight average molecular weight" means that determined by gel permeation chromatography (GPC).

The acidic functional group in the acidic functional group-modified olefinic polymer (B) may be bonded to any position in the olefinic polymer. The modified ratio is not necessarily limited, but the acidic functional group-modified olefinic polymer (B) commonly has an acid value of 10 to 70 mg KOH/g and preferably 20 to 60 mg KOH/g. The polymer having an acid value of less than 10 mg KOH/g cannot improve the roll lubricity, and the polymer having an acid value of more than 70 mg KOH/g causes plate out to a roll. Here, the plate out to a roll means adhering or depositing of a component contained in the resin composition, an oxidation, decomposition, combination, or degradation product of the component, or the like to a metal roll surface during the melt film formation of the resin composition using the metal roll. In the specification, the "acid value" means that determined by neutralization titration in accordance with Japanese Industrial Standard K0070-1992.

The acidic functional group-modified olefinic polymer (B) is obtained by reaction of the acidic functional group-containing unsaturated compound and the unmodified polyolefin polymer in the presence of an organic peroxide. The organic peroxide to be used may be an initiator that is commonly used for radical polymerization. Such reaction may be carried out by either solution process or melting process.

In the solution process, a mixture of the unmodified polyolefin polymer and the acidic functional group-containing unsaturated compound is dissolved in an organic solvent together with an organic peroxide, and the solution is heated to give the acidic functional group-modified olefinic polymer (B). The reaction temperature is preferably about 110 to 170° C.

In the melting process, a mixture of the unmodified polyolefin polymer and the acidic functional group-containing unsaturated compound is mixed with an organic peroxide, and the whole is melted and mixed for reaction to give the acidic functional group-modified olefinic polymer (B). The melt-mixing can be carried out with various mixers such as an extruder, a Brabender, a kneader, and a Banbury mixer, and the kneading temperature is commonly from a melting point of the unmodified polyolefin polymer to 300° C.

The acidic functional group-modified olefinic polymer (B) is preferably a maleic anhydride group-modified polypropylene. For the acidic functional group-modified olefinic polymer (B), commercial products may be used, and examples include "Umex (registered trademark) 1010" (maleic anhydride group-modified polypropylene, acid value: 52 mg KOH/g, weight average molecular weight: 32,000, modified ratio: 10% by weight), "Umex (registered trademark) 1001" (maleic anhydride group-modified polypropylene, acid value: 26 mg KOH/g, weight average molecular weight: 49,000, modified ratio: 5% by weight), and "Umex (registered trademark) 2000" (maleic anhydride group-modified polyethylene, acid. value: 30 mg KOH/g, weight average molecular weight: 20,000, modified ratio: 5% by weight), each manufactured by Sanyo Chemical Industries, Ltd.

The content of the acidic functional group-modified olefinic polymer (B) is not necessarily limited and commonly 0.1 to 10.0 parts by weight based on 100 parts by weight of the poly lactic acid (A). The content is preferably 0.1 to 5.0 parts by weight and particularly preferably 0.3 to 3.0 parts by weight in order to continue the roll lubricity effect without plate out to a roll and to maintain the biomass degree. The polymer having a content of less than 0.1 part by weight is unlikely to improve the roll lubricity, and the polymer having a content of more than 10.0 parts by weight cannot achieve effects corresponding to the amount added and reduces the biomass degree. Here, the biomass degree means the ratio of the dry weight of biomass used to the dry weight of the film or sheet. The biomass means renewable organic resources derived from biological materials except for fossil resources.

[Tetrafluoroethylene Polymer (C)]

The tetrafluoroethylene polymer (C) included in the film or sheet of the present invention can improve the melt tension of the poly lactic acid (A)-containing resin composition and achieve oriented crystallization in a flow field in the melt film formation process to accelerate the crystallization of the poly lactic acid (A). The tetrafluoroethylene polymer (C) also works as a crystal nucleating agent for the poly lactic acid (A). Hence, the temperature setting of the resin composition immediately after the film formation to around a crystallization temperature can further accelerate the crystallization of the poly lactic acid (A). Thus, the tetrafluoroethylene polymer (C) accelerates the crystallization of the poly lactic acid (A) and therefore can provide heat resistance to the film or sheet of the present invention.

The tetrafluoroethylene polymer (C) used in the present invention is a homopolymer of tetrafluoroethylene or a copolymer of tetrafluoroethylene and another monomer, and examples include polytetrafluoroethylene, perfluoroalkoxyalkane (a copolymer of tetrafluoroethylene and perfluoroalkyl vinyl ether), a perfluoroethylene propene copolymer (a copolymer of tetrafluoroethylene and hexafluoropropylene), an ethylene-tetrafluoroethylene copolymer (a copolymer of tetrafluoroethylene and ethylene), and a copolymer of tetrafluoroethylene and perfluorodioxole. Polytetrafluoroethylene is preferred.

It is supposed that the effect of the tetrafluoroethylene polymer (C) as a crystal nucleating agent on the poly lactic acid (A) depends on the crystal structure of the tetrafluoroethylene polymer (C). Wide angle x-ray diffraction revealed that the poly lactic acid (A) had a crystal lattice having an interplanar spacing of 4.8 angstroms while the tetrafluoroethylene polymer had a crystal lattice having an interplanar spacing of 4.9 angstroms. The results suggest that the tetrafluoroethylene polymer (C) can work as the crystal nucleating agent for the poly lactic acid (A) due to an epitaxial effect. Here, the epitaxis means the crystal growth of the poly lactic acid (A) that is aligned with the crystal face on the crystal surface of the tetrafluoroethylene polymer (C) in the crystal growth of the poly lactic acid (A) on the surface of the tetrafluoroethylene polymer (C).

The tetrafluoroethylene polymer (C) has the same interplanar spacing as that of a copolymer of tetrafluoroethylene and another monomer because the interplanar spacing depends on the crystal form of the tetrafluoroethylene moiety. Hence, as long as the crystal form of the polytetrafluoroethylene is maintained and the physical properties are not greatly changed, the amount of another monomer component in the copolymer is not specifically limited, but other monomer components are commonly preferably included in an amount of 5% by weight or less in the tetrafluoroethylene polymer (C).

The polymerization method of the tetrafluoroethylene polymer (C) is not necessarily limited but is specifically preferably emulsification polymerization. The tetrafluoroethylene polymer (C) obtained through the emulsification polymerization is readily fibrillated to readily form a network structure in the poly lactic acid (A). Then, this is supposed to improve the melt tension of the resin composition including the poly lactic acid (A) and to effectively accelerate the crystallization of the poly lactic acid (A) in the flow field in the melt film formation process.

The weight average molecular weight of the tetrafluoroethylene polymer (C) is not necessarily limited, and commonly 1,000,000 to 10,000,000 and preferably 2,000,000 to 8,000,000.

Furthermore, for uniform dispersion in the poly lactic acid (A), particles of the "tetrafluoroethylene polymer (C)" may be modified with a polymer having high affinity to the poly lactic acid (A), such as a (meth)acrylic acid ester polymer. Examples of such a tetrafluoroethylene polymer (C) include acrylic-modified polytetrafluoroethylene.

Commercially available tetrafluoroethylene polymers (C) may be used, and examples of the commercially available polytetrafluoroethylene include "Fluon (registered trademark) CD-014", "Fluon (registered trademark) CD-1", and "Fluon (registered trademark) CD-145" manufactured by ASAHI GLASS CO., LTD. Examples of the commercially available acrylic-modified polytetrafluoroethylene include Metablen (registered trademark), series A (for example, A-3000 and A-3800) manufactured by Mitsubishi Rayon Co., Ltd.

The content of the tetrafluoroethylene polymer (C) is commonly 0.5 to 15.0 parts by weight based on 100 parts by weight of the poly lactic acid (A). The content is preferably 0.7 to 10.0 parts by weight and particularly preferably 1.0 to 5.0 parts by weight in order to improve the melt tension, to maintain the biomass degree, and to obtain a good surface condition. The polymer having a content of less than 0.5 part by weight is unlikely to improve the melt tension, and the polymer having a content of more than 15.0 parts by weight cannot achieve effects corresponding to the amount added and reduces the biomass degree.

[Dicarboxylic Acid Ester-Containing Plasticizer (D)]

The dicarboxylic acid ester-containing plasticizer (D) included in the film or sheet of the present invention has an effect as a plasticizer to provide desired flexibility to the resin composition including the poly lactic acid (A). The dicarboxylic acid ester-containing plasticizer (D) includes a compound represented by General Formula (1).

[Formula 4]

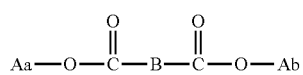

(1)

(Where B is a 1,2-phenylene group or $-CH_2(CH_2)_mCH_2-$ (where m is an integer of 0 to 6); each of Aa and Ab is independently selected from (1) to (3) (where a compound in which both Aa and Ab are (3) is excluded): (1) $C_6H_5-(Ac)-$ (where Ac is an alkylene group having 1 to 4 carbon atoms); (2) $(Ae)-(Ad-O)_n-$ (where Ad is an alkylene group having 1 to 5 carbon atoms, Ae is an alkyl group having 1 to 7 carbon atoms, and n is an integer of 1 to 4); and (3) an alkyl group having 1 to 14 carbon atoms)

Hereinafter, the definition of each group in General Formula (1) will be described in details.

Examples of the "alkylene group having 1 to 4 carbon atoms" represented by Ac include a methylene group, an ethylene group, a trimethylene group, and a tetramethylene group, and a methylene group is preferred.

Examples of the "alkylene group having 1 to 5 carbon atoms" represented by Ad include straight or branched alkylene groups such as a methylene group, an ethylene group, a trimethylene group, a propylene group, a tetramethylene group, a 1,1'-dimethylethylene group, and a pentamethylene group, and an ethylene group is preferred.

The "alkyl group having 1 to 7 carbon atoms" represented by Ae may be a straight or branched chain, and examples of the group include a methyl group, an ethyl group, a propyl group, an isopropyl group, a butyl group, an isobutyl group, a sec-butyl group, a tent-butyl group, a pentyl group, a 2-pentyl group, a 3-pentyl group, a neopentyl group, a tert-pentyl group, a hexyl group, an isohexyl group, and a heptyl group.

The "alkyl group having 1 to 14 carbon atoms" means a straight or branched saturated hydrocarbon group having 1 to 14 carbon atoms, and examples of the group include a methyl group, an ethyl group, a propyl group, an isopropyl group, a butyl group, an isobutyl group, a sec-butyl group, a tert-butyl group, a pentyl group, an isopentyl group, a neopentyl group, a 1,2-dimethylpropyl group, a 1-ethylpropyl group, a hexyl group, an isohexyl group, a 1,2,2-trimethylpropyl group, a 1,1-dimethylbutyl group, a 2,2-dimethylbutyl group, a 3,3-dimethylbutyl group, a 2-ethylbutyl group, a heptyl group, an isoheptyl group, a 2-ethylhexyl group, an octyl group, an isooctyl group, a nonyl group, an isononyl group, a decyl group, an isodecyl group, an undecyl group, an isoundecyl group, a dodecyl group, an isododecyl group, a tridecyl group, an isotridecyl group, a tetradecyl group, and an isotetradecyl group. Alkyl groups having 1 to 8 carbon atoms are preferred, and a butyl group and a 2-ethylhexyl group are more preferred.

m is an integer of 0 to 6, and m is preferably 2. n is an integer of 1 to 4, and n is preferably 2.

Among the compounds represented by General Formula (1), a compound in which both Aa and Ab are alkyl groups having 1 to 14 carbon atoms is not included in the dicarboxylic acid ester-containing plasticizer (D) of the present invention. That is, at least one of Aa and Ab is required to include an aryl group such as a phenylene group or an oxyalkylene chain such as an oxyethylene chain. The dicarboxylic acid ester-containing plasticizer (D) of the present invention has high hydrolysis resistance and low volatility. Thus, the catalytic hydrolysis by the poly lactic acid can be suppressed and a small amount of the plasticizer can provide flexibility to the poly lactic acid. In particular, a particular combination amount can also provide stress relaxation property. Furthermore, the low volatility leads to good workability during film formation to give a poly lactic acid-containing flexible film or sheet having stable performance.

In contrast, a low molecular weight plasticizer in which both Aa and Ab include no aryl group or no oxyalkylene chain has a large plasticization effect and can provide flexibility even when it is included in a small amount. However, it has large volatility at a processing temperature of the poly lactic acid (about 150 to 180° C.), hence the working environment is deteriorated, and the included plasticizer does not remain in the film to lead to unstable performance.

The dicarboxylic acid ester-containing plasticizer (D) included in the film or sheet of the present invention is preferably a phthalate ester-containing plasticizer (DP) that is selected from compounds of General Formulae (2) to (6).

[Formula 5]

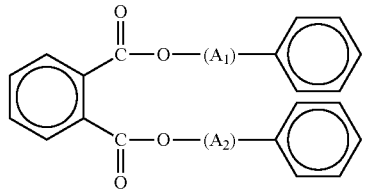

(2)

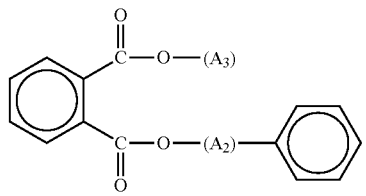

(3)

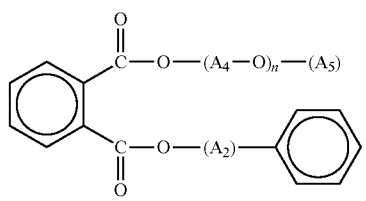

(4)

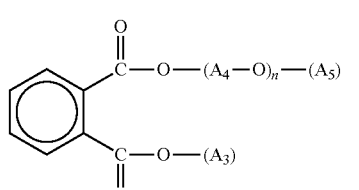

(5)

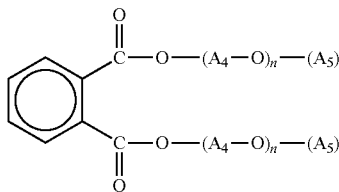
(6)

Where A1 and A2 may be the same or different from each other; each of A1 and A2 is an alkylene group having 1 to 4 carbon atoms; A3 is an alkyl group having 1 to 14 carbon atoms; A4 is an alkylene group having 1 to 5 carbon atoms; and A5 is an alkyl group having 1 to 7 carbon atoms. n is an integer of 1 to 4.

The "alkylene group having 1 to 4 carbon atoms", the "alkylene group having 1 to 5 carbon atoms", the "alkyl group having 1 to 7 carbon atoms", and the "alkyl group having 1 to 14 carbon atoms" are as defined above.

Specific examples of the compound represented by General Formulae (2) to (6) include ethyl benzyl phthalate, butyl benzyl phthalate, (2-ethylhexyl) benzyl phthalate, (2-ethylhexyl) butyl diglycol phthalate, butyl (ethyl diglycol) phthalate, bis(butyl diglycol) phthalate, and benzyl (butyl diglycol) phthalate.

The dicarboxylic acid ester-containing plasticizer (D) included in the film or sheet of the present invention is preferably an aliphatic dicarboxylic acid ester-containing plasticizer (DA) that is selected from compounds of General Formulae (7) to (11).

[Formula 6]

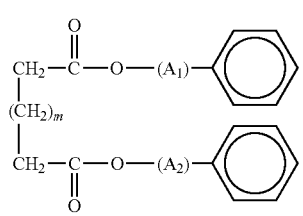
(7)

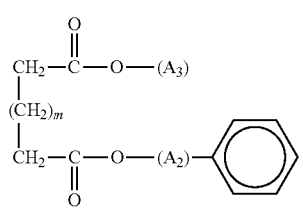
(8)

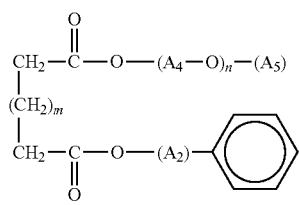
(9)

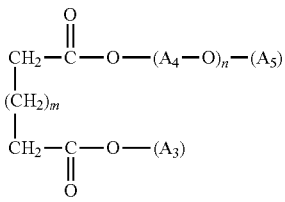
(10)

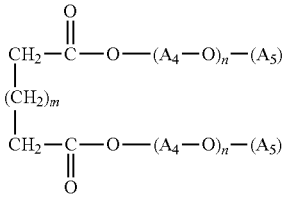
(11)

Where A1 and A2 may be the same or different from each other; each of A1 and A2 is an alkylene group having 1 to 4 carbon atoms; A3 is an alkyl group having 1 to 14 carbon atoms; A4 is an alkylene group having 1 to 5 carbon atoms; and A5 is an alkyl group having 1 to 7 carbon atoms. n is an integer of 1 to 4, and m is an integer of 0 to 6.

The "alkylene group having 1 to 4 carbon atoms", the "alkylene group having 1 to 5 carbon atoms", the "alkyl group having 1 to 7 carbon atoms" and the "alkyl group having 1 to 14 carbon atoms" are as defined above.

Specific examples of the compound represented by General Formulae (7) to (11) include (2-ethylhexyl) benzyl adipate, butyl benzyl adipate, (2-ethylhexyl) benzyl azelate, (2-ethylhexyl) benzyl sebacate, (2-ethylhexyl) butyl diglycol adipate, benzyl (methoxyethoxyethyl) adipate, bis (butyl diglycol) adipate, and bis[2-(2-butoxyethoxy)ethyl] adipate.

As described above, the dicarboxylic acid ester-containing plasticizer (D) includes the phthalate ester-containing plasticizer (DP) and the aliphatic dicarboxylic acid ester-containing plasticizer (DA).

The content of the dicarboxylic acid ester-containing plasticizer (D) is preferably 8 parts by weight or more and less than 40 parts by weight based on 100 parts by weight of the poly lactic acid (A). Among them, the content of the phthalate ester-containing plasticizer (DP) is commonly 10 parts by weight or more and less than 40 parts by weight, preferably 12 parts by weight or more and less than 40 parts by weight, and more preferably 15 to 38 parts by weight, based on 100 parts by weight of the poly lactic acid (A). The content of the aliphatic dicarboxylic acid ester-containing plasticizer (DA) is commonly 8 to 35 parts by weight, preferably 10 to 30 parts by weight, and more preferably 12 to 27 parts by weight, based on 100 parts by weight of the poly lactic acid (A). The dicarboxylic acid ester-containing plasticizer (D) having a content of less than 8 parts by weight is unlikely to provide flexibility, and the plasticizer having a content of 40 parts by weight or more causes plate out and interferes with crystallization of the poly lactic acid to remarkably reduce the heat resistance.

[Crystallization Accelerator (E)]

The resin composition of the present invention may include another crystallization accelerator (E) in addition to the tetrafluoroethylene polymer (C). The crystallization accelerator (E) is not specifically limited as long as it has a crystallization acceleration effect, but it is desirable to select a substance having a crystal structure that has an interplanar spacing similar to that of the crystal lattice of the poly lactic acid (A). This is because a substance including a crystal lattice having an interplanar spacing more similar to that of the crystal lattice of the poly lactic acid (A) has a higher effect as a crystal nucleating agent for the poly lactic acid (A). Examples of such a crystallization accelerator (E) include organic substances such as melamine polyphosphate, melamine cyanurate, zinc phenylphosphonate, calcium phenylphosphonate, and magnesium phenylphosphonate and inorganic substances such as talc and clay. Among them, zinc phenylphosphonate is preferred because it has the interplanar spacing most similar to the interplanar spacing of the poly lactic acid (A) and can provide a good crystallization acceleration effect.

A commercially available crystallization accelerator (E) may be used. Examples of commercially available zinc phenylphosphonate include "ECOPROMOTE" manufactured by Nissan Chemical Industries, Ltd.

The content of the crystallization accelerator (E) is commonly 0.1 to 5 parts by weight based on 100 parts by weight of the poly lactic acid (A). The content is preferably 0.3 to 3 parts by weight in order to further accelerate the crystallization and to maintain the biomass degree. The accelerator having a content of less than 0.1 part by weight is unlikely to accelerate the crystallization, and the accelerator having a content of more than 5 parts by weight cannot achieve effects corresponding to the amount added and reduces the biomass degree.

The poly lactic acid (A)-containing resin composition may include various additives as necessary as long as the object of the present invention is not impaired. Examples of such additives include known antioxidants, ultraviolet absorbers, plasticizers, stabilizers, release agents, antistatic agents, colorants, and drip inhibitors.

[Mechanical Properties]

As the index of flexibility of the film or sheet of the present invention, the tensile elongation at break and the residual stress ratio were determined.

The film or sheet of the present invention preferably has a tensile elongation at break of 100% or more that is determined in accordance with the test method of "Plastics-Determination of Tensile Properties" in Japanese Industrial Standard K7161. Furthermore, it preferably has a residual stress ratio of 40% or less at a displacement of 10% in accordance with the test method. A film or sheet having a tensile elongation at break and a residual stress ratio within the ranges can be flexible and relax stress during drawing.

The film or sheet of the present invention having a flexibility and a residual stress ratio within the ranges can be achieved by limiting each content of the poly lactic acid (A), the acidic functional group-modified olefinic polymer (B), the tetrafluoroethylene polymer (C), and the dicarboxylic acid ester-containing plasticizer (D) of General Formula (1) within the range defined by the present invention. In particular, it is important to limit the content of the dicarboxylic acid ester-containing plasticizer (D) within the range defined by the present invention.

[Heat Deformation Rate]

The heat deformation rate of the film or sheet of the present invention is determined in accordance with the heat deformation test in Japanese Industrial Standard C3005.

The film or sheet of the present invention preferably has a deformation rate of 40% or less under a load of 10 N for 30 minutes in a temperature environment of 120° C.

[Relative Crystallization Rate]

The relative crystallization rate of the film or sheet of the present invention is calculated using Equation (I) from the amount of heat $\Delta Hc$ at the exothermic peak associated with crystallization of a sample of the film or sheet in a temperature rise process after film formation and the amount of heat $\Delta Hm$ associated with the subsequent melting that are determined by DSC.

$$\text{Relative crystallization rate (\%)} = (\Delta Hm - \Delta Hc)/\Delta Hm \times 100 \quad \text{(I)}$$

The film or sheet of the present invention preferably has a relative crystallization rate of 50% or more.

More preferably, the film or sheet of the present invention has a deformation rate of 40% or less under a load of 10 N for 30 minutes in a temperature environment of 120° C. in accordance with the heat test in Japanese Industrial Standard C3005 and has a relative crystallization rate of 50% or more that is calculated from Equation (I).

In order to obtain the film or sheet of the present invention having a deformation rate of 40% or less and a relative crystallization rate of 50% or more, it is important to limit each content of the poly lactic acid (A), the acidic functional group-modified olefinic polymer (B), the tetrafluoroethylene polymer (C), and the dicarboxylic acid ester-containing plasticizer (D) of General Formula (1) within the range defined by the present invention, in particular, to limit the content of the tetrafluoroethylene polymer (C) and the content of the dicarboxylic acid ester-containing plasticizer (D) within the ranges defined by the present invention. In order to achieve the film or sheet of the present invention having a deformation rate of 40% or less and a relative crystallization rate of 50% or more, it is also important to employ, as the method for manufacturing the film or sheet of the present invention, a manufacturing method (described later) that includes forming a film from a poly lactic acid (A)-containing resin composition by melt film formation, in which the resin composition during the melt film formation has a temperature between a temperature 15° C. higher than a crystallization temperature (Tc) of the resin composition in a temperature drop process and a temperature 5° C. lower than a melting temperature (Tm) in a temperature rise process and/or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)].

The film or sheet of the present invention may be used for applications similar to those of common films or sheets, but in particular, can be suitably used as a base of a pressure-sensitive adhesive film or sheet.

[Method for Manufacturing Film or Sheet]

The method for manufacturing the film or sheet of the present invention is not necessarily limited and is preferably a method of forming a film from the poly lactic acid (A)-containing resin composition by melt film formation. For example, the film or sheet of the present invention can be manufactured by preparing the poly lactic acid (A)-containing resin composition including each component that is homogeneously dispersed by a continuous melt kneader such as a twin screw extruder or a batch melt kneader such as a pressure kneader, a Banbury mixer, and a roll kneader, then by forming a film from the resin composition by an extrusion method such as a T-die method and an inflation method, calendering, polishing, or the like, and by cooling and solidifying the film. The melt film formation is preferably a technique of forming a film having a desired thickness by passing the melted resin composition through a space between two metal rolls, and is particularly preferably calendering and polishing.

The thickness of the film or sheet of the present invention is properly adjusted depending on the intended use, but is commonly 10 to 500 μm, preferably 20 to 400 μm, and particularly preferably 30 to 300 μm.

When the poly lactic acid (A)-containing resin composition is formed into a film by the melt film formation, the temperature of the resin composition during the melt film formation (hereinafter, referred to as the resin temperature during the melt film formation) is not necessarily limited, but is preferably between a temperature 15° C. higher than a crystallization temperature (Tc) of the resin composition in a temperature drop process and a temperature 5° C. lower than a melting temperature (Tm) in a temperature rise process. The adjustment to such a temperature accelerates the crystallization of the poly lactic acid (A) and readily provides the heat resistance to the film or sheet of the present invention.

For example, when the resin composition is melted to form a film by calendering, the temperature of the resin composition during the calender rolling (corresponding to the resin temperature during the melt film formation) is adjusted to between a temperature 15° C. higher than the crystallization temperature (Tc) of the resin composition in a temperature drop process and a temperature 5° C. lower than the melting temperature (Tm) in a temperature rise process. Such rolling at a melting point or lower accelerates the oriented crystallization. The acceleration effect on the oriented crystallization is much improved by the combination of the tetrafluoroethylene polymer (C) with the resin composition. The tetrafluoroethylene polymer (C) is fibrillated to form a network in the resin composition and also works as the crystal nucleating agent. It is supposed that such a synergistic effect accelerates the oriented crystallization. Therefore, by the rolling within the temperature range, the film or sheet of the present invention can obtain a smooth surface condition as well as good heat resistance due to the oriented crystallization acceleration effect (that is, the reduction of the relative crystallization rate is suppressed, and the increase of the heat deformation rate is suppressed).

The method for manufacturing the poly lactic acid-containing film or sheet of the present invention may further include a step of controlling a temperature condition after the melt film formation in order to effectively accelerate the crystallization by the tetrafluoroethylene polymer (C). Specifically, the melt film formed resin composition may be cooled and solidified after a step of accelerating the crystallization (hereinafter, also simply abbreviated to "crystallization accelerating step") by once keeping the resin composition between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)]. That is, the crystallization accelerating step is a step of subjecting the melt film formed resin composition to a condition where the temperature is controlled between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)], and a step of capable of accelerating the crystallization of the resin composition while maintaining the smooth surface condition after the melt film formation. Examples of such a temperature control method include, but are not necessarily limited to, a method of bringing the melt film formed resin composition into direct contact with a roll, belt, or the like that can be heated at a predetermined temperature.

In particular, the melt film formed resin composition is desirably brought into contact with a metal roll having a predetermined surface temperature from the viewpoint of constant control at a predetermined temperature. Hence, also in the step, the poly lactic acid (A)-containing resin composition is desirably a composition that can be readily removed from a metal roll, and also from this viewpoint, the acidic functional group-modified olefinic polymer (B) is required to be added.

It is preferred that the time for the crystallization accelerating step is as long as possible. The time is not necessarily limited because it finally depends on the crystallization degree of the resin composition, but is commonly 2 to 10 seconds and preferably 3 to 8 seconds.

In the crystallization accelerating step, even when the crystallization temperature (Tc) of the resin composition in a temperature drop process is changed due to, for example, the addition of another crystal nucleating agent, the maximum temperature of an exothermic peak associated with the crystallization in a temperature drop process is previously determined with a differential scanning calorimeter (DSC) to constantly give an optimum temperature condition for the crystallization accelerating step. At that time, the consideration to the shape change of the film or sheet obtained by heat at the temperature is little required, but the step is preferably performed at a temperature at which the obtained film or sheet has a heat deformation rate of 40% or less.

The method for manufacturing the poly lactic acid-containing film or sheet of the present invention is preferably a method that includes forming a film from a poly lactic acid (A)-containing resin composition by melt film formation. In the method, the temperature of the resin composition during the melt film formation (the resin temperature during the melt film formation) is between a temperature 15° C. higher than a crystallization temperature (Tc) of the resin composition in a temperature drop process and a temperature 5° C. lower than a melting temperature (Tm) in a temperature rise process and/or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)].

In the method for manufacturing the poly lactic acid-containing film or sheet of the present invention including the crystallization accelerating step, the resin composition is crystallized in the crystallization accelerating step and then cooled and solidified. Hence, the internal stress is unlikely to remain, and the obtained film or sheet does not cause large heat shrink when it is used. Therefore, the highly crystallized film or sheet of the present invention that is formed into a film by the manufacturing method can keep the shape to near the melting point of the poly lactic acid and can be sufficiently used for applications that require heat resistance and that are not previously applicable. The manufacturing method has large advantages in economy and productivity because it does not require inefficient steps of cooling and solidifying and then heating again.

It is desirable that the method for manufacturing the poly lactic acid-containing film or sheet of the present invention including the crystallization accelerating step is continuously carried out from the melt film formation step, the crystallization accelerating step, to the cooling and solidifying step from the viewpoint of productivity because such a system shortens the treatment time. Examples of such a method include methods using a calender film formation machine, a polishing film formation machine, and the like.

[Calender Film Formation]

FIG. 1 shows a schematic view of a calender film formation machine used in an embodiment of the manufacturing method. Hereinafter, FIG. 1 will be described in detail.

Between four calender rolls, a first roll (1), a second roll (2), a third roll (3), and a fourth roll (4), the melted resin composition is rolled to gradually reduce the thickness. The rolling is adjusted so that the resin composition will have a desired thickness after the resin composition is finally passed through between the third roll (3) and the fourth roll (4). In the case of the calender film formation, the film formation of the resin composition from the first to fourth rolls (1) to (4) corresponds to the "melt film formation step". Take off rolls (5) having a temperature between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)] are a roll group with which the melt film formed resin composition (8) is initially in contact. The roll group includes one or more rolls (three rolls in FIG. 1) and removes the melted resin composition (8) from the fourth roll (4). When a plurality of take off rolls (5) is used in this manner and the temperature of each roll can be controlled, each roll preferably has the same temperature but may have a different temperature within a desired temperature range. A larger number of the take off rolls (5) increases the time for isothermal crystallization and has an advantage in the acceleration of crystallization. In the case of the calender film formation, the crystallization of the melt film formed resin composition (8) is accelerated on the take off rolls (5), and thus the step of passing the resin composition (8) through the take off rolls (5) corresponds to the "crystallization accelerating step".

Two cool rolls (6) and (7) cool and solidify the resin composition (8) by passing the resin composition (8) between them and also form the surface into a desired shape. Thus, commonly, one roll (for example, the cool roll (6)) is a metal roll that has a surface designed for providing a surface shape to the resin composition (8), and the other roll (for example, the cool roll (7)) is a rubber roll. In FIG., each arrow means a rotation direction of a corresponding roll.

[Polishing Film Formation]

Figure 2:
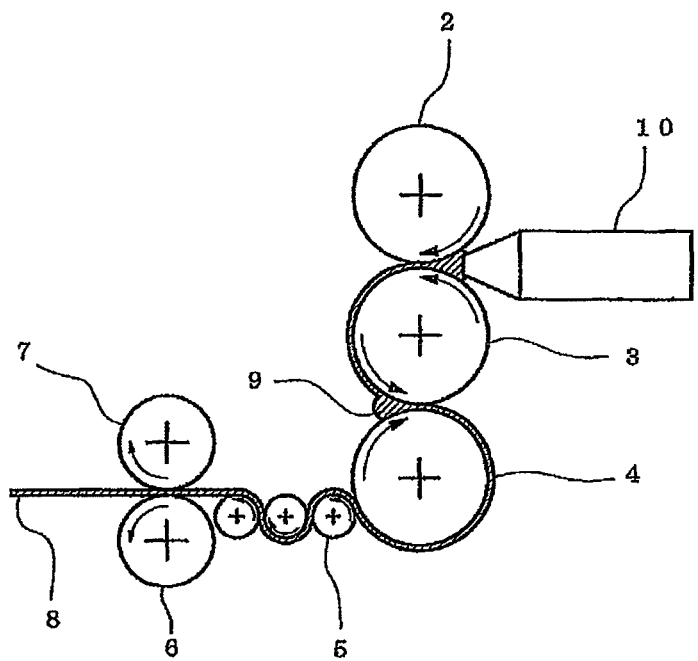
FIG. 2 is a schematic view of a polishing film formation machine.

FIG. 2 shows a schematic view of a polishing film formation machine used in an embodiment of the manufacturing method. Hereinafter, FIG. 2 will be described in detail.

An extruder leading end (10) of an extruder (not shown in the drawing) is placed between a heated second roll (2) and a heated third roll (3). Between the second roll (2) and the third roll (3), a melted resin composition (8) is continuously extruded at a predetermined extrusion speed. The extruded resin composition (8) is rolled between the second roll (2) and the third roll (3) to have a smaller thickness. The rolling is adjusted so that the resin composition will have a desired thickness after the resin composition is finally passed through between the third roll (3) and the fourth roll (4). In the case of the polishing film formation, the film formation of the resin composition (8) from the second to fourth rolls (2) to (4) corresponds to the "melt film formation step". Then, the film is passed through three take off rolls (5) having a temperature between a temperature 25° C. lower than a crystallization temperature (Tc) of the resin composition (8) in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)] and finally passed through cool rolls (6) and (7) to prepare a solidified film or sheet. In the case of the polishing film formation, the step of passing the resin composition through the take off rolls (5) corresponds to the "crystallization accelerating step".

EXAMPLES

Hereinafter, the present invention will be further specifically described with reference to examples and comparative examples. The present invention is not intended to be limited to them.

Abbreviations of material names used in Table 1 to be described later are shown below.

[Poly lactic Acid (A)]

A1: Lacea (registered trademark) H-400 (manufactured by Mitsui Chemicals, Inc.)

[Acidic Functional Group-Modified Olefinic Polymer (B)]

B1: maleic anhydride-modified polypropylene (weight average molecular weight=49,000, acid value=26 mg KOH/g): Umex (registered trademark) 1001 (manufactured by Sanyo Chemical Industries, Ltd.)

B2: maleic anhydride-modified polypropylene (weight average molecular weight=32,000, acid value=52 mg KOH/g): Umex (registered trademark) 1010 (manufactured by Sanyo Chemical Industries, Ltd.)

A component (B') below was studied in order to be compared with the component (B1) and the component (B2).

B': unmodified low molecular weight polypropylene (weight average molecular weight=23,000, acid value=0 mg KOH/g): VISCOL (registered trademark) 440P (manufactured by Sanyo Chemical Industries, Ltd.)

[Tetrafluoroethylene Polymer (C)]

C1: polytetrafluoroethylene: Fluon (registered trademark) CD-014 (manufactured by ASAHI GLASS CO., LTD.)

C2: acrylic-modified polytetrafluoroethylene: Metablen. (registered trademark) A-3000 (manufactured by Mitsubishi Rayon Co., Ltd.)

[Phthalate Ester-Containing Plasticizer (DP)]

DP1: butyl benzyl phthalate: BBP (manufactured by DAIHACHI CHEMICAL INDUSTRY CO., LTD.), a molecular weight of 314

DP2: (2-ethylhexyl)benzyl phthalate: Santicizer 261A (manufactured by Ferro Japan), a molecular weight of 370

A phthalate ester-containing plasticizer (DP') below was studied in order to be compared with the components (DP1) and (DP2).

DP': bis(2-ethylhexyl)phthalate: DOP (manufactured by DIC Corporation), a molecular weight of 391

[Aliphatic Dicarboxylic Acid Ester-Containing Plasticizer (DA)]

(DA1): bis[2-(2-butoxyethoxy)ethyl] adipate: BXA (manufactured by DAIHACHI CHEMICAL INDUSTRY CO., LTD.), a molecular weight of 435

(DA2): benzyl (methoxyethoxyethyl) adipate: DAIFATTY-101 (manufactured by DAIHACHI CHEMICAL INDUSTRY CO., LTD., registered trademark), a molecular weight of 338

A phthalate ester-containing plasticizer (DA') below was studied in order to be compared with the components (DA1) and (DA2).

(DA'): diisononyl adipate: W-242 (manufactured by DIC Corporation), a molecular weight of 398
[Crystallization Accelerator (E)]
E1: zinc phenylphosphonate: ECOPROMOTE (manufactured by Nissan Chemical Industries, Ltd.)

Example 1

The raw materials above were mixed in a compounding ratio shown in Table 1 to prepare a resin composition. The resin composition was melted and kneaded with a Banbury mixer, and then subjected to calender film formation (melt film formation) using a 4-roll inverted L calender so as to have a thickness of 100 μm. Next, as shown in FIG. 1, three rolls (take off rolls) that could be heated at any temperature were placed immediately after the melt film formation step to arrange a crystallization accelerating step where the melt film formed resin composition could be passed while the upper side and the lower side of the film alternately came in contact with the rolls. Then, the resin composition was solidified by passing through cool rolls to prepare a film. The temperature of the resin composition during the melt film formation (the resin temperature during the melt film formation) was regarded as the surface temperature of the roll corresponding to the fourth roll (4) in FIG. 1, and for the temperature of the resin composition in the crystallization accelerating step, the surface temperatures of three take off rolls (5) in FIG. 1 were adjusted to substantially the same and regarded as the crystallization acceleration temperature. The film formation speed was 5 m/min, and the substantial time for the crystallization accelerating step (passage time through the take off rolls) was about 5 seconds.

Examples 2 to 5

Each resin composition was prepared in the compounding ratio shown in Table 1 and subjected to the same operation as that in Example 1 to prepare each film of Examples 2 to 5.

Comparative Examples 1 to 7

Each resin composition was prepared in the compounding ratio shown in Table 1 and subjected to the same operation as that in Example 1 to prepare each film of Comparative Examples 1 to 7.

Each sample prepared in Examples and Comparative Examples was evaluated in the following manner.
<Melting Temperature>
The endothermic peak temperature associated with the melting of the resin composition in a temperature rerise process after film formation was determined by a DSC to be regarded as the melting temperature (Tm; also referred to as crystal melting peak temperature).
<Crystallization Temperature>
The exothermic peak temperature associated with the crystallization of the resin composition in a temperature drop process from 200° C. after film formation was determined by a DSC to be regarded as the crystallization temperature (Tc; also referred to as crystallization peak temperature).
<Film Formability Evaluation>
(1) Releasability: The releasability was evaluated on the melt film formed resin composition from the fourth roll (4) in FIG. 1. The resin composition capable of being taken off onto the take off roll (5) was evaluated as "A", and that incapable of being taken off onto the take off roll (5) was evaluated as "B".

(2) Volatile resistance: The resin composition during film formation was visually observed. The resin composition without volatilization (white smoke) was evaluated as "A" (without), and that with volatilization was evaluated as "B" (with).
(3) Plate out to roll: A roll surface was visually observed and evaluated as "A" for no dirt on the roll surface and as "B" for any dirt on the roll surface.
The evaluation of plate out to a roll was not carried out on Comparative Example 3 because it was not removed.
<Relative Crystallization Rate>
The amount of heat ΔHc of the exothermic peak associated with the crystallization of the film sample in the temperature rise process after film formation and the amount of heat ΔHm associated with the subsequent melting were determined by a DSC (differential scanning calorimeter) to calculate the relative crystallization rate using Equation (I). Comparative Example 3 was not evaluated because it was not removed.

$$\text{Relative crystallization rate (\%)} = (\Delta Hm - \Delta Hc)/\Delta Hm \times 100 \quad \text{(I)}$$

Acceptance evaluation: The film having a relative crystallization rate of 50% or more was regarded as acceptance.
The DSC used for determination of the melting temperature (Tm), the crystallization temperature (Tc), and the relative crystallization rate and the measurement conditions were as follows.
Apparatus: DSC 6220 manufactured by SII NanoTechnology Inc.
Conditions: measurement temperature region; from 20° C., 200° C., 0° C., to 200° C. (that is, first, measurement was carried out in a temperature rise process from 20° C. to 200° C., then in a temperature drop process from 200° C. to 0° C., and finally in a temperature rerise process from 0° C. to 200° C.)
Temperature rise rate/temperature drop rate: 2° C./min
Measurement atmosphere: under a nitrogen atmosphere (200 ml/min)
No exothermic peak associated with the crystallization was observed in the temperature rerise process. Hence, it was judged that 100% of a crystallizable region was crystallized at a temperature drop rate of 2° C./min, and the validity of the equation for the relative crystallization rate was confirmed.
<Heat Deformation Rate>
The heat deformation rate was determined in accordance with the heat deformation test in Japanese Industrial Standard C3005. The measurement apparatus and measurement conditions used are as follows.
Apparatus: Heat deformation tester manufactured by TESTER SANGYO CO., LTD.
Conditions: sample size: 1 mm thickness×25 mm width× 40 mm length (films were stacked into a total thickness of 1 mm)
Measurement temperature: 120° C.
Load: 10 N
Measurement time 30 minutes (the test started without aging considering recrystallization)
Calculation method of heat deformation rate: The thickness T1 before the test and the thickness T2 after the test were determined, and the heat deformation rate was calculated using Equation (II). Comparative Example 3 was not evaluated because it was not removed.

$$\text{Heat deformation rate (\%)} = (T1 - T2)/T1 \times 100 \quad \text{(II)}$$

Acceptance evaluation: The film having a heat deformation rate of 40% or less was regarded as acceptance.

<Tensile Elongation at Break>

The tensile elongation at break was determined in accordance with the test method of Plastics-Determination of Tensile Properties in Japanese Industrial Standard K7161.

The measurement apparatus and measurement conditions used are as follows.

Apparatus: tensile tester (Autograph AG-20kNG manufactured by Shimadzu Corporation)

Sample size: 0.1 mm thickness×10 mm width×100 mm length

The sample was cut out so that the direction parallel to the longitudinal direction would be the machine direction (MD) during the film formation.

Measurement conditions: a chuck distance of 50 mm
a tensile speed of 300 mm/min

Acceptance evaluation: each sample was subjected to the test under the conditions above, and the elongation value at the film break was determined to give the tensile elongation at break. The film having a tensile elongation at break of 100% or more was regarded as acceptance.

<Residual Stress Ratio>

The residual stress ratio as the index for stress relaxation property was determined in accordance with the test method of Plastics-Determination of Tensile Properties in Japanese Industrial Standard K7161.

The measurement apparatus and measurement conditions used are as follows.

Apparatus: tensile tester (Autograph AG-20kNG manufactured by Shimadzu Corporation)

Conditions: sample size: 0.1 mm thickness×10 mm width× 100 mm length

The sample was cut out so that the direction parallel to the longitudinal direction would be the machine direction (MD) during the film formation.

A chuck distance of 50 mm

A tensile speed of 300 mm/min

Measurement: The displacement was stopped when the displacement reached 10%, and the film was kept at the position. The stress at the time was regarded as 100%, and the residual stress value after 60 seconds was recorded to calculate the "residual stress ratio".

Acceptance evaluation: the film having a residual stress ratio of 40% or less was regarded as acceptance.

Table 2 shows the evaluation results of each test piece of Examples 1 to 5 and Comparative Examples 1 to 7 prepared based on the composition table in Table 1.

The evaluation results shown in Table 2 reveal that each film of Examples 1 to 5 according to the present invention ensured flexibility based on a tensile elongation at break of 100% or more and a residual stress ratio of 40% or less. It is also ascertained that each film had a high relative crystallization rate and a suppressed heat deformation rate, and hence the heat resistance was ensured. Each film further had good releasability and good volatile resistance and did not cause the plate out to a roll.

In contrast, in each film of Comparative Examples 1 and 2 using a low molecular weight plasticizer that is not included in the dicarboxylic acid ester-containing plasticizer (D) of General Formula (1) of the present invention(that is, a plasticizer of General Formula (1) in which Aa and Ab include no aryl group and no oxyalkylene chain), the volatilization of the plasticizer and the plate out to a roll were observed, and the tensile elongation at break and the stress relaxation property were insufficient. The film of Comparative Example 3 that included no acidic functional group-modified olefinic polymer (3) had poor releasability from a roll. Each film of Comparative Examples 4 and 5 that contained the dicarboxylic acid ester-containing plasticizer (D) of General Formula (1) in an insufficient amount had a poor tensile elongation at break and a poor stress relaxation property. Each film of Comparative Examples 6 and 7 that contained the dicarboxylic acid ester-containing plasticizer (D) in an excess amount had a poor heat resistance. That is, in Comparative Examples 1 to 7 containing no component according to the present invention or not having the compounding ratio according to the present invention, a film satisfying both desired flexibility and heat resistance could not be obtained.

TABLE 1

| Material name | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| A1 | 100 | 100 | 100 | 100 | 100 | 100 | 100 | 100 | 100 | 100 | 100 | 100 |
| B1 |  | 1.0 |  | 1.0 |  |  | 1.0 |  | 0.5 | 1.0 |  |  |
| B2 | 2.0 |  | 1.0 |  | 3.0 | 2.0 |  |  |  |  | 1.0 | 1.0 |
| B' |  |  |  |  |  |  |  | 2.0 |  |  |  |  |
| C1 | 8.0 |  |  |  | 4.0 | 3.0 |  | 3.0 |  | 2.0 |  |  |
| C2 |  | 5.0 | 3.0 | 4.0 |  |  | 5.0 |  | 2.0 |  | 8.0 | 7.0 |
| DP1 |  | 25 |  |  |  |  |  |  | 20 | 5 |  |  |
| DP2 | 35 |  |  |  |  |  |  |  |  |  | 50 |  |
| DP' |  |  |  |  |  |  | 35 |  |  |  |  |  |
| DA1 |  | 15 |  | 25 |  |  |  |  |  | 5 |  |  |
| DA2 |  |  | 20 |  |  |  |  |  |  |  |  | 40 |
| DA' |  |  |  |  |  |  |  | 20 |  |  |  |  |
| E1 | 2.0 | 1.0 | 1.0 | 1.0 | 3.0 |  | 1.0 |  |  |  | 3.0 | 2.0 |

Unit: part by weight

TABLE 2

| | Evaluation | Example 1 | Example 2 | Example 3 | Example 4 | Example 5 | Comparative Example 1 | Comparative Example 2 |
|---|---|---|---|---|---|---|---|---|
| | Film thickness (μm) | 100 | 100 | 100 | 100 | 100 | 100 | 100 |
| DSC date for resin composition (° C.) | Melting temperature Tm | 156 | 158 | 161 | 160 | 158 | 162 | 160 |
| | Crystallization temperature Tc | 122 | 123 | 125 | 123 | 122 | 115 | 121 |

TABLE 2-continued

| | | | | | | | | |
|---|---|---|---|---|---|---|---|---|
| Setting temperature (° C.) | Resin temperature during melt film formation | 150 | 150 | 150 | 150 | 150 | 155 | 150 |
| | Crystallization acceleration temperature | 120 | 120 | 125 | 125 | 120 | 115 | 120 |
| Film formability result | Releasability | A | A | A | A | A | A | A |
| | Volatile resistance | A | A | A | A | A | B | B |
| | Plate out to roll | A | A | A | A | A | B | B |
| Relative crystallization rate (%) | | 65 | 72 | 76 | 75 | 70 | 65 | 72 |
| Heat deformation rate (%) | | 31 | 25 | 22 | 35 | 28 | 31 | 23 |
| Tensile elongation at break (%) | | 320 | 290 | 250 | 270 | 330 | 55 | 60 |
| Residual stress ratio (%) | | 9 | 18 | 24 | 21 | 17 | 52 | 58 |

| | Evaluation | Comparative Example 3 | Comparative Example 4 | Comparative Example 5 | Comparative Example 6 | Comparative Example 7 |
|---|---|---|---|---|---|---|
| | Film thickness (μm) | 100 | 100 | 100 | 100 | 100 |
| DSC date for resin composition (° C.) | Melting temperature Tm | 159 | 167 | 165 | 148 | 151 |
| | Crystallization temperature Tc | 113 | 118 | 119 | 115 | 116 |
| Setting temperature (° C.) | Resin temperature during melt film formation | 150 | 155 | 155 | 140 | 140 |
| | Crystallization acceleration temperature | 115 | 120 | 120 | 115 | 115 |
| Film formability result | Releasability | B | A | A | A | A |
| | Volatile resistance | A | A | A | A | A |
| | Plate out to roll | —*1 | A | A | B | B |
| Relative crystallization rate (%) | | —*1 | 85 | 87 | 34 | 41 |
| Heat deformation rate (%) | | —*1 | 15 | 14 | 73 | 69 |
| Tensile elongation at break (%) | | —*1 | 11 | 13 | 340 | 290 |
| Residual stress ratio (%) | | —*1 | 64 | 68 | 8 | 8 |

*1: A film could not be formed because of poor releasability.

INDUSTRIAL APPLICABILITY

The film or sheet of the present invention can be used for wide applications similar to those of common films or sheets, but in particular, can be suitably used as a base of a pressure-sensitive adhesive film or sheet.

REFERENCE SIGNS LIST

1 First roll
2 Second roll
3 Third roll
4 Fourth roll
5 Take off roll
6 Cool roll
7 Cool roll
8 Resin composition
9 Bank (resin puddle)
10 Extruder leading end

The invention claimed is:

1. A film or sheet composed of a resin composition comprising:

a poly lactic acid (A);

an acidic functional group-modified olefinic polymer (B) including an acidic functional group and having an acid value of 10 to 70 mg KOH/g and a weight average molecular weight of 10,000 to 80,000;

a tetrafluoroethylene polymer (C);

a dicarboxylic acid ester-containing plasticizer (D) of Formula (1);

[Formula 1]

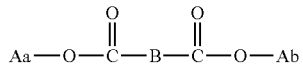

and a crystallization accelerator (E) selected from the group consisting of melamine polyphosphate, zinc phenylphosphonate, calcium phenylphosphonate, and magnesium phenylphosphonate;

the acidic functional group-modified olefinic polymer (B) being included in an amount of 0.3 to 3.0 parts by weight based on 100 parts by weight of the poly lactic acid (A), the tetrafluoroethylene polymer (C) being included in an amount of 1.0 to 5.0 parts by weight based on 100 parts by weight of the poly lactic acid (A), the dicarboxylic acid ester-containing plasticizer (D) being included in an amount of 12 to 38 parts by weight based on 100 parts by weight of the poly lactic acid (A), the crystallization accelerator (E) being included in an amount of 0.3 to 3 parts by weight based on 100 parts by weight of the poly lactic acid (A), wherein B is a 1,2-phenylene group or $-CH_2(CH_2)_mCH_2-$ wherein m is an integer of 0 to 6; and each of Aa and Ab is independently selected from (1) to (3) wherein a compound in which both Aa and Ab are (3) is excluded: (1) $C_6H_5-(Ac)-$ wherein Ac is an alkylene group having 1 to 4 carbon atoms; (2) $(Ae)-(Ad-O)_n-$ wherein Ad is an alkylene group having 1 to 5 carbon atoms, Ae is an alkyl group having 1 to 7 carbon atoms, and n is an integer of 1 to 4; and (3) an alkyl group having 1 to 14 carbon atoms.

2. The film or sheet according to claim 1, wherein the dicarboxylic acid ester-containing plasticizer (D) is a phthalate ester-containing plasticizer (DP) selected from compounds of Formulae (2) to (6), and the phthalate ester-containing plasticizer (DP) is included in an amount of 12 to 38 parts by weight based on 100 parts by weight of the poly lactic acid (A),

[Formula 2]

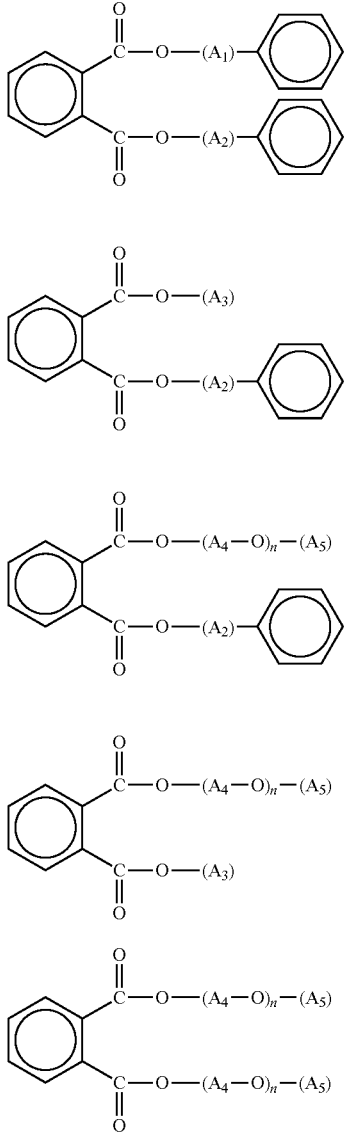

wherein A1 and A2 are the same or different from each other; each of A1 and A2 is an alkylene group having 1 to 4 carbon atoms; A3 is an alkyl group having 1 to 14 carbon atoms; A4 is an alkylene group having 1 to 5 carbon atoms; A5 is an alkyl group having 1 to 7 carbon atoms; and n is an integer of 1 to 4.

3. The film or sheet according to claim 1, wherein the dicarboxylic acid ester-containing plasticizer (D) is an aliphatic dicarboxylic acid ester-containing plasticizer (DA) selected from compounds of General Formulae (7) to (11), and the aliphatic dicarboxylic acid ester-containing plasticizer (DA) is included in an amount of 12 to 35 parts by weight based on 100 parts by weight of the poly lactic acid (A),

[Formula 3]

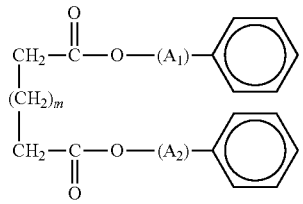

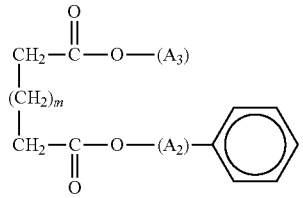

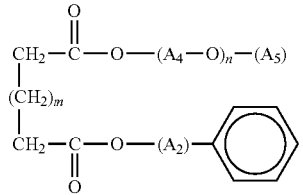

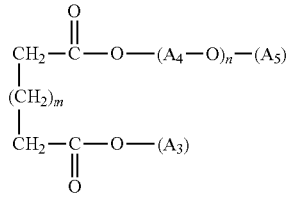

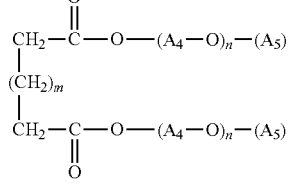

wherein A1 and A2 are the same or different from each other; each of A1 and A2 is an alkylene group having 1 to 4 carbon atoms; A3 is an alkyl group having 1 to 14 carbon atoms; A4 is an alkylene group having 1 to 5 carbon atoms; A5 is an alkyl group having 1 to 7 carbon atoms; n is an integer of 1 to 4; and m is an integer of 0 to 6.

4. The film or sheet according to claim 1, wherein the acidic functional group included in the acidic functional group-modified olefinic polymer (B) is a carboxylic acid anhydride group.

5. The film or sheet according to claim 1 having a deformation rate of 40% or less under a load of 10 N for 30 minutes in a temperature environment of 120° C. in accordance with heat deformation test in Japanese Industrial Standard C3005, and having a relative crystallization rate of 50% or more calculated from Equation (I), $$\text{Relative crystallization rate } (\%) = (\Delta Hm - \Delta Hc)/\Delta Hm \times 100 \quad (I)$$

wherein $\Delta Hc$ is an amount of heat of an exothermic peak associated with crystallization of the film or sheet in a temperature rise process after film formation, and ΔHm is an amount of heat associated with melting.

6. The film or sheet according to claim 1 having a tensile elongation at break of 100% or more and a residual stress ratio of 40% or less at a stretch of 10%.

7. A method for manufacturing the film or sheet according to claim 1, the method comprising forming a film from a resin composition by melt film formation, the resin composition during the melt film formation having a temperature between a temperature 15° C. higher than a crystallization temperature (Tc) of the resin composition in a temperature drop process and a temperature 5° C. lower than a melting temperature (Tm) in a temperature rise process or the melt film formed resin composition being cooled and solidified after a crystallization accelerating step between a temperature 25° C. lower than a crystallization temperature (Tc) of the resin composition in a temperature drop process and a temperature 10° C. higher than the crystallization temperature (Tc).

8. The method for manufacturing the film or sheet according to claim 7, wherein the resin composition during the melt film formation has a temperature between a temperature 15° C. higher than a crystallization temperature (Tc) of the resin composition in a temperature drop process and a temperature 5° C. lower than a melting temperature (Tm) in a temperature rise process and the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc).

9. The method for manufacturing the film or sheet according to claim 7, wherein the melt film formation is a technique of forming a film having a desired thickness by passing the melted resin composition through a space between two metal rolls.

10. The method for manufacturing the film or sheet according to claim 7, wherein the crystallization accelerating step is performed by using a metal roll.

11. A pressure-sensitive adhesive film or sheet comprising the film or sheet according to claim 1 as a base.

12. The film or sheet according to claim 1, wherein the dicarboxylic acid ester-containing plasticizer (D) is selected from compounds of Formulae (2) to (11),

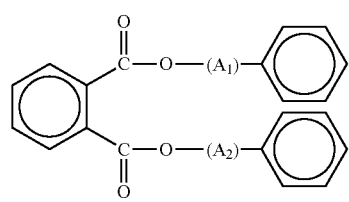

(2)

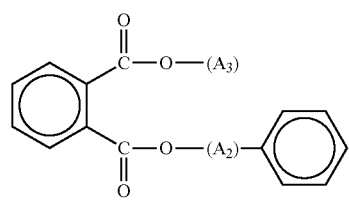

(3)

-continued

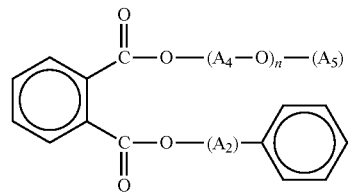

(4)

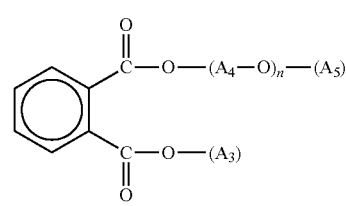

(5)

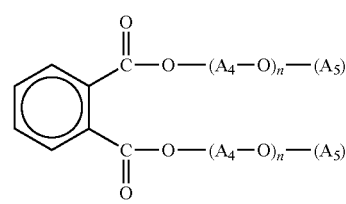

(6)

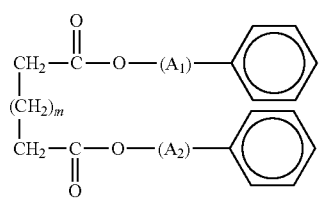

(7)

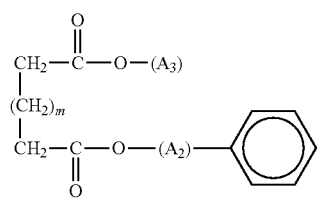

(8)

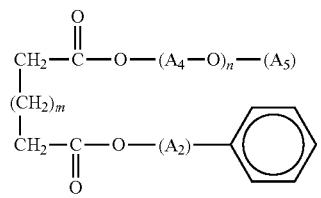

(9)

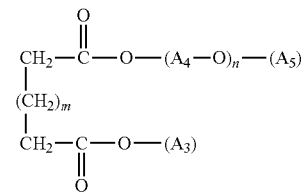

(10)

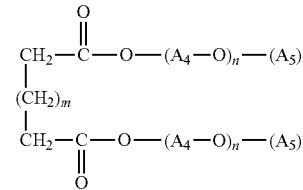

(11)

wherein A1 and A2 are the same or different from each other; each of A1 and A2 is an alkylene group having 1 to 4 carbon atoms; A3 is an alkyl group having 1 to 14 carbon atoms; A4 is an alkylene group having 1 to 5 carbon atoms; A5 is an alkyl group having 1 to 7 carbon atoms; and n is an integer of 1 to 4; and m is an integer of 0 to 6.

13. The film or sheet according to claim 12, wherein the acidic functional group-modified olefinic polymer (B) is a maleic anhydride group-modified polypropylene.

14. The film or sheet according to claim 1, wherein the dicarboxylic acid ester-containing plasticizer (D) is selected from the group consisting of ethyl benzyl phthalate, butyl benzyl phthalate, (2-ethylhexyl) benzyl phthalate, (2-ethylhexyl) butyl diglycol phthalate, butyl (ethyl diglycol) phthalate, bis(butyl diglycol) phthalate, benzyl (butyl diglycol) phthalate, (2-ethylhexyl) benzyl adipate, butyl benzyl adipate, (2-ethylhexyl) benzyl azelate, (2-ethylhexyl) benzyl sebacate, (2-ethylhexyl) butyl diglycol adipate, benzyl (methoxyethoxyethyl) adipate, bis(butyl diglycol) adipate, and bis[2-(2-butoxyethoxy)ethyl] adipate.

15. The film or sheet according to claim 1, wherein the acidic functional group-modified olefinic polymer (B) is a maleic anhydride group-modified polypropylene.

16. The film or sheet according to claim 1, wherein the crystallization accelerator (E) is a zinc phenylphosphonate.

17. The film or sheet according to claim 1, wherein the acidic functional group-modified olefinic polymer (B) has an acid value of 20 to 60 mg KOH/g and a weight average molecular weight of 20,000 to 60,000.

18. A film or sheet composed of a resin composition comprising:
    a poly lactic acid;
    an acidic functional group-modified olefinic polymer (B) including an acidic functional group and having an acid value of 26 to 52 mg KOH/g and a weight average molecular weight of 32,000 to 49,000;
    a tetrafluoroethylene polymer (C);
    a dicarboxylic acid ester-containing plasticizer (D) being selected from the group consisting of butyl benzyl phthalate, (2-ethylhexyl) benzyl phthalate, bis[2-(2-butoxyethoxy)ethyl] adipate, and benzyl (methoxyethoxyethyl) adipate;
    and a crystallization accelerator (E);
    the acidic functional group-modified olefinic polymer (B) being included in an amount of 1.0 to 3.0 parts by weight,
    the tetrafluoroethylene polymer (C) being included in an amount of 3.0 to 5.0 parts by weight,
    the dicarboxylic acid ester-containing plasticizer (D) being included in an amount of 15 to 35 parts by weight, and
    the crystallization accelerator (E) being included in an amount of 1.0 to 3.0 parts by weight based on 100 parts by weight of the poly lactic acid (A),
    wherein the acidic functional group-modified olefinic polymer (B) is a maleic anhydride group-modified polypropylene, and
    the crystallization accelerator (E) is a zinc phenylphosphonate.

* * * * *